United States Patent
Lee et al.

(10) Patent No.: US 9,087,101 B2
(45) Date of Patent: Jul. 21, 2015

(54) DOCUMENT MANAGEMENT TECHNIQUES TO ACCOUNT FOR USER-SPECIFIC PATTERNS IN DOCUMENT METADATA

(71) Applicant: JPMorgan Chase Bank, N.A., New York, NY (US)

(72) Inventors: Sih X Lee, Northvale, NJ (US); Adrian Kunzle, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 14/553,376

(22) Filed: Nov. 25, 2014

(65) Prior Publication Data

US 2015/0081705 A1    Mar. 19, 2015

Related U.S. Application Data

(60) Continuation of application No. 13/611,573, filed on Sep. 12, 2012, now Pat. No. 8,924,414, which is a division of application No. 12/796,752, filed on Jun. 9, 2010, now Pat. No. 8,290,938, which is a continuation of application No. 11/872,874, filed on Oct. 16, 2007, now Pat. No. 7,761,471.

(51) Int. Cl.
*G06F 17/30* (2006.01)

(52) U.S. Cl.
CPC ................ *G06F 17/30424* (2013.01)

(58) Field of Classification Search
None
See application file for complete search history.

(56) References Cited

U.S. PATENT DOCUMENTS

| | | |
|---|---|---|
| 5,666,490 A | 9/1997 | Brown et al. |
| 6,026,388 A | 2/2000 | Liddy et al. |
| 6,266,683 B1 | 7/2001 | Yehuda et al. |
| 6,560,597 B1 | 5/2003 | Dhillon et al. |
| 7,461,006 B2 | 12/2008 | Gogolak |
| 7,635,088 B2 | 12/2009 | Chung et al. |
| 7,707,206 B2 * | 4/2010 | Encina et al. ............. 707/716 |
| 7,830,571 B2 | 11/2010 | Ishizuka et al. |
| 7,856,441 B1 | 12/2010 | Kraft et al. |
| 7,912,842 B1 | 3/2011 | Baylis |
| 7,966,341 B2 | 6/2011 | Maghoul et al. |

(Continued)

FOREIGN PATENT DOCUMENTS

| | | |
|---|---|---|
| EP | 1203315 | 6/2000 |
| WO | 2009041757 | 3/2008 |

*Primary Examiner* — Wilson Lee
(74) *Attorney, Agent, or Firm* — Goodwin Procter LLLP

(57) ABSTRACT

Document management techniques to account for user-specific patterns in document metadata are disclosed. In one embodiment, a method for facilitating document retrieval may comprise: assigning a first entitlement to a first user for accessing a first plurality of documents; identifying patterns in the first user's creation or modification of metadata related to the first plurality of documents; recording the identified patterns associated with the first user; receiving a document query from a second user who has been assigned a second entitlement to access a second plurality of documents; determining, based on the second entitlement, an access right of the second user with respect to the first plurality of documents; and modifying the document query based on the access right of the second user and the identified patterns, such that the document query returns relevant documents from the first plurality of documents despite the second user's ignorance of the identified patterns.

20 Claims, 7 Drawing Sheets

(56) References Cited

U.S. PATENT DOCUMENTS

| | | |
|---|---|---|
| 8,051,289 B2 | 11/2011 | Hyman et al. |
| 8,352,477 B2 | 1/2013 | Uchida et al. |
| 2002/0010701 A1 | 1/2002 | Kosciuszko et al. |
| 2004/0044791 A1 | 3/2004 | Pouzzner |
| 2005/0114614 A1 | 5/2005 | Anderson et al. |
| 2005/0125807 A1 | 6/2005 | Brady |
| 2006/0041553 A1 | 2/2006 | Paczkowski et al. |
| 2006/0167896 A1 | 7/2006 | Kapur |
| 2006/0173873 A1 | 8/2006 | Prompt et al. |
| 2006/0195427 A1 | 8/2006 | Kilroy |
| 2006/0247944 A1 | 11/2006 | Calusinski et al. |
| 2007/0011154 A1 | 1/2007 | Musgrove et al. |
| 2007/0011305 A1 | 1/2007 | Brady et al. |
| 2007/0016491 A1 | 1/2007 | Wang |
| 2007/0087756 A1 | 4/2007 | Hoffberg |
| 2007/0208751 A1 | 9/2007 | Cowan et al. |
| 2007/0250494 A1 | 10/2007 | Peoples et al. |
| 2008/0082601 A1 | 4/2008 | Meijer et al. |
| 2008/0082959 A1* | 4/2008 | Fowler ................. 717/104 |
| 2008/0104145 A1* | 5/2008 | Lipman et al. ............... 707/204 |
| 2008/0114628 A1 | 5/2008 | Johnson et al. |
| 2008/0184349 A1 | 7/2008 | Ting et al. |
| 2008/0253403 A1 | 10/2008 | Bondy |
| 2008/0256082 A1 | 10/2008 | Davies et al. |
| 2008/0313134 A1 | 12/2008 | Lei et al. |
| 2009/0037367 A1 | 2/2009 | Wein et al. |
| 2009/0055374 A1 | 2/2009 | Surazski et al. |

* cited by examiner

DOCUMENT MANAGEMENT TECHNIQUES TO ACCOUNT FOR USER-SPECIFIC PATTERNS IN DOCUMENT METADATA

CROSS-REFERENCE TO RELATED APPLICATIONS

The present application is a continuation of U.S. patent application Ser. No. 13/611,573, filed Sep. 12, 2012, which is a divisional of U.S. patent application Ser. No. 12/796,752, filed Jun. 9, 2010, now U.S. Pat. No. 8,290,938, which is a continuation of U.S. patent application Ser. No. 11/872,874, filed Oct. 16, 2007, now U.S. Pat. No. 7,761,471, all entitled "Document Management Techniques To Account For User-Specific Patterns In Document Metadata" and all of which are incorporated herein by reference in their entireties.

FIELD OF THE INVENTION

The present invention relates generally to electronic document management. More particularly, the present invention relates to document management techniques to account for user-specific patterns in document metadata.

BACKGROUND OF THE INVENTION

Modern document management systems employ computers and storage devices to store and track electronic documents, images of paper documents, and other types of digital content. Typical functions of electronic document management (EDM) involve the creation, storage, organization, transmission, retrieval, manipulation, update, and eventual disposition of documents to fulfill an organizational purpose. A successfully implemented document management system (DMS) can improve communication among people and groups of people, which is especially valuable to large enterprises where a huge amount of information is documented and shared among a number of internal and/or external users on a continuing basis.

Many aspects of document management (e.g., organization and retrieval) rely on document metadata which are descriptive or informational data concerning various aspects of underlying documents. With respect to each document, a corresponding set of metadata usually provides information about the document itself, its change or versioning history, related users, storage location, access or distribution restrictions, and any other information that might facilitate the understanding, use, or management of the document. One of the most common uses of document metadata is to facilitate document retrieval. For example, a single document may be directly retrieved from a DMS if a user provides a unique identifier of the document such as a document number. A list of documents may be retrieved by running a structured query language (SQL) search, which typically identifies relevant documents whose metadata match the specified search criteria.

While a typical DMS can automatically generate some metadata for a document (e.g., detect its application type and assign a document number), a significant portion of the metadata is created by a human user who creates the document and/or other users who have entitlement to access the document. For example, when creating a new document in a DMS, a user (e.g., author or typist) may be prompted to enter information regarding the document, thereby establishing an initial set of metadata for that document. Other users who are authorized to make changes to that document may subsequently update it or create newer version(s) thereof, thereby changing the metadata of that document.

FIG. 1 shows a typical "New Document Profile" form that a DMS user may be required to fill in when creating a new document. The "New Document Profile" form may include a number of metadata fields which may be populated with text entries, pop-out menus, or pull-down menus. As shown, the metadata fields cover several aspects of document information, such as basic document identification (e.g., Document Title, Client/Subject, and Matter/Transaction), creator information (e.g., Author ID, Typist ID, and Dept./Team), storage and retention (e.g., Database Location and Length of Retention), security and access control (e.g., Sharing and Security Level). A similar form associated with an existing document, such as a "Document Profile" or "Document Properties" form, may be displayed to an authorized user to make changes to one or more properties of the document.

The above-described human involvements in the creation or modification of document metadata can cause problems for subsequent document retrieval. For various reasons, each individual user of a DMS may have his or her own personal preferences or habits in describing documents. That is, with respect to a same document, one user may choose a set of metadata (e.g., text strings and menu items) to describe that document which are substantially different from another user's choice of metadata. For example, one user may be in the habit of using a set of aliases and/or acronyms in document title fields that are unknown or make no sense to another user. Even when two users happen to choose the same text string or menu item in a metadata field, the text string or menu item may have quite different meanings for the two users. Take, for example, a document related to credit account collections, which should have been categorized under the subject matter of "Account Recovery." However, a first user may categorize that document under "Credit Risks" because this user considers almost all credit card matters as appropriately related to credit risks. Yet, a second user may categorize that same document under "Delinquencies" because collections logically follow delinquencies. A third user may even categorize the credit account collections document under "Customer Relations" for good reasons.

In many instances, the differences in choosing or entering document metadata arise from human laziness. For example, in order to avoid populating several metadata fields every time a new document is created, a tardy user may keep choosing substantially the same set of metadata to describe different documents, varying the metadata only slightly (e.g., in the title field). Over time, this kind of practice will generate a large number of documents with essentially the same combination of metadata, making it difficult for a traditional SQL query to distinguish one document from another.

Similar examples of user-specific naming patterns abound.

As a result, while a user who knows his or her own preferences or habits may have no trouble retrieving his or her own documents, other users might not be able to locate those documents with traditional SQL queries formulated based on those users' own understanding or interpretation of keywords and categories. This can become especially troublesome when one employee who has unique ways of naming documents leaves a company. Colleagues of that employee or successors to his position may have no clue where he has effectively "hidden" his documents.

Currently, there are no known adequate solutions for document retrieval problems caused by user-specific naming patterns. One natural approach is to simply broaden a document query to make it over-inclusive. However, without any knowledge of a prior user's unconventional ways of naming documents, it is difficult, if not impossible, to know how broadly to expand a search to ensure coverage of that prior user's documents. If the search is overbroad, it may return a list of hundreds of documents. Similarly, it is inefficient to attempt to browse through all documents created by a prior user. Besides, if the prior user named a relevant document in a cryptic way (e.g., using acronyms and shorthand spellings), a subsequent searcher probably will not recognize it as a hit simply by glancing at the document title.

Another approach is to always conduct a full-text content search in combination with or in addition to the usual metadata search. However, full-text searches are slow, wasteful of system resources, and unfeasible for image files or other non-text formats.

Yet another approach is to further break down each metadata field and supply as many standardized menu items as possible for users to choose from. This approach also suffers from several drawbacks. First, it is often difficult to anticipate all possible kinds of documents and provide standardized menu items in advance and down to the most granular level. Second, increased selection of menu items can slow down both document creation and query formulation. Third, there is a limit as to how many menu items an ordinary user is willing to browse through. Over-granulated menus can be confusing for ordinary users who may be reluctant to spend the time to pick the most appropriate menu item.

In view of the foregoing, it may be understood that there are significant problems and shortcomings associated with current document management technologies.

SUMMARY OF THE INVENTION

Document management techniques to account for user-specific patterns in document metadata are disclosed. In one particular exemplary embodiment, the techniques may be realized as a method for facilitating document retrieval in an electronic document management system. The method may comprise the steps of: assigning a first entitlement to a first user for accessing a first plurality of documents; identifying one or more patterns in the first user's creation or modification of metadata related to the first plurality of documents; recording the one or more identified patterns associated with the first user; receiving a document query from a second user who has been assigned a second entitlement to access a second plurality of documents; determining, based on the second entitlement, an access right of the second user with respect to the first plurality of documents; and modifying the document query based on the access right of the second user and the one or more identified patterns, such that the document query returns one or more relevant documents from the first plurality of documents despite the second user's ignorance of the one or more identified patterns.

In another particular exemplary embodiment, the techniques may be realized as a system for facilitating document retrieval in an electronic document management system. The system may comprise at least one processor unit and at least one storage unit, both coupled to an electronic document management system. The at least one processor unit may be configured to: assign a first entitlement to a first user for accessing a first plurality of documents in the electronic document management system, identify one or more patterns in the first user's creation or modification of metadata related to the first plurality of documents, record the one or more identified patterns associated with the first user in the at least one storage unit, receive a document query from a second user who has been assigned a second entitlement to access a second plurality of documents, determine, based on the second entitlement, an access right of the second user with respect to the first plurality of documents, and modify the document query based on the access right of the second user and the one or more identified patterns, such that the document query returns one or more relevant documents from the first plurality of documents despite the second user's ignorance of the one or more identified patterns.

In yet another particular exemplary embodiment, the techniques may be realized as a method for facilitating document retrieval in an electronic document management system. The method may comprise the steps of: identifying one or more first patterns in a first user's creation or modification of metadata related to a first plurality of documents that the first user has a first entitlement to access; identifying one or more second patterns in a second user's creation or modification of metadata related to a second plurality of documents that the second user has a second entitlement to access, the second entitlement being commensurate with the first entitlement; and modifying the metadata related to the first plurality of documents, based on the one or more first patterns, to conform to the one or more second patterns, such that a document query from the second user encompasses a relevant portion of the first plurality of documents despite the second user's ignorance of the one or more first patterns.

In a further particular exemplary embodiment, the techniques may be realized as a method for facilitating document retrieval in an electronic document management system. The method may comprise the steps of: identifying one or more patterns in a first user's creation or modification of metadata related to a plurality of documents that the first user has a first entitlement to access; and normalizing at least a portion of the metadata to mitigate a skewing effect from the one or more patterns on a document query from a second user, the second user having a second entitlement that is commensurate with the first entitlement.

In a still further particular exemplary embodiment, the techniques may be realized as a method for facilitating document retrieval in an electronic document management system. The method may comprise the steps of: assigning a first entitlement to a first user for accessing a first plurality of documents; identifying one or more patterns in the first user's creation or modification of metadata related to the first plurality of documents; recording the one or more identified patterns associated with the first user; receiving a document query from a second user who has been assigned a second entitlement to access to a second plurality of documents; determining whether the second entitlement permits the second user to access at least one portion of the first plurality of documents; and modifying the document query based on the one or more identified patterns, if the second entitlement permits the second user to access at least one portion of the first plurality of documents, such that the modified document query returns relevant documents from said at least one portion of the first plurality of documents despite the second user's ignorance of the one or more identified patterns.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Figure 1:
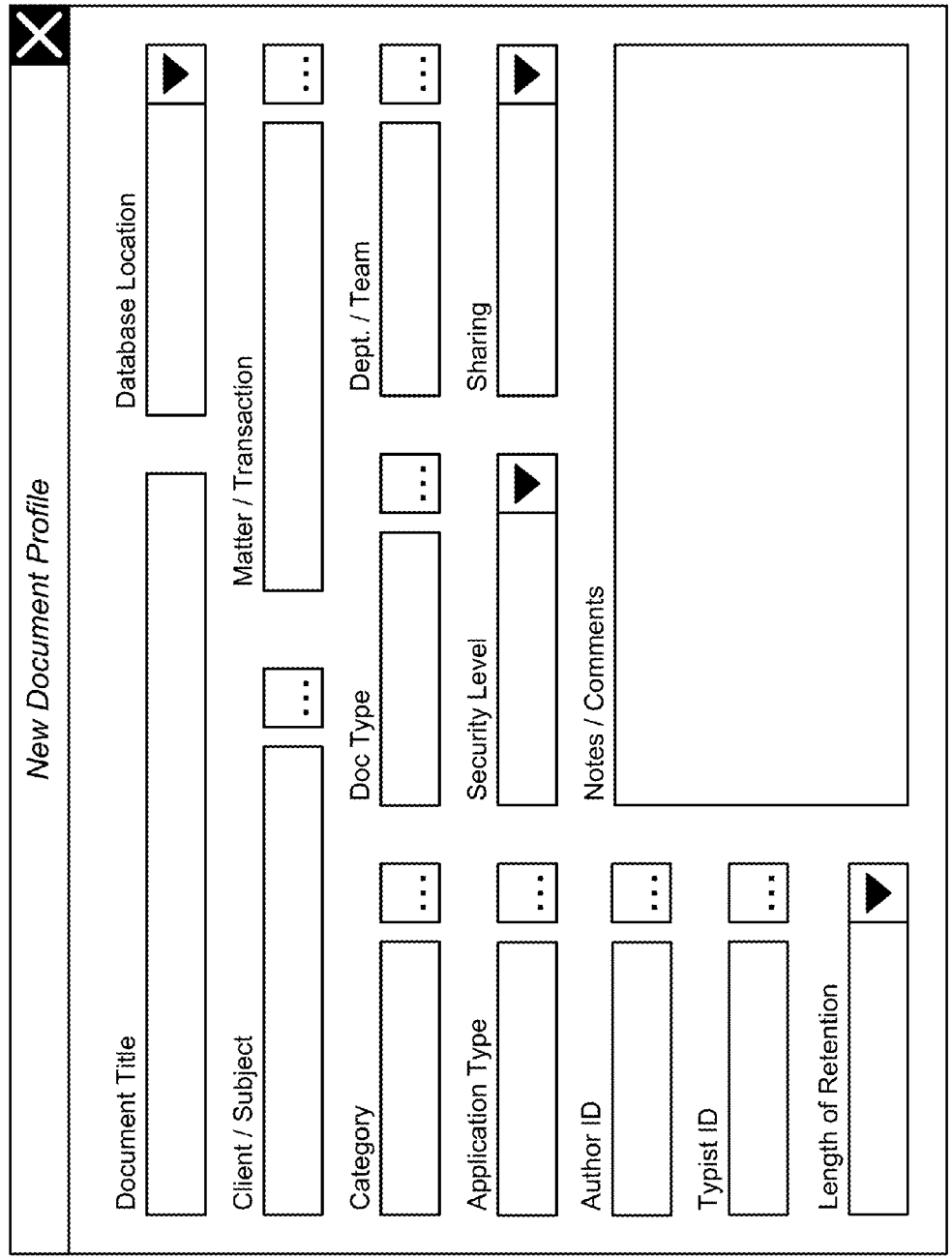
FIG. 1 shows a typical "New Document Profile" form that a DMS user may be required to fill in when creating a new document.

Embodiments of the present invention provide document management techniques to account for user-specific naming patterns. Document metadata created and/or modified by individual users may be monitored, analyzed or otherwise processed to capture user-specific naming patterns in describing documents. Such user-specific naming patterns may be stored in association with individual users. Metadata of one user's documents may be modified or enhanced based on the naming patterns of that user. The user-specific naming patterns may be employed in a number of ways to facilitate more effective and more efficient document retrieval. For example, a subsequent document query submitted by one user may be modified or enhanced based on the naming patterns of other users who have commensurate entitlements as the user submitting the query. Alternatively, metadata of one user's documents may be converted, based on that user's naming patterns, either to conform to another user's naming patterns or to comply with a standard naming convention.

As used herein, a "document" refers to a computer file or electronic file that can be in any format, of any size, and have any content. In a financial institution such as a consumer bank, a payment card issuer, or a investment bank, documents managed with a DMS may include but are not limited to account balance sheets, transaction history files, customer profiles, credit applications, credit history files, risk analysis papers, banking or credit card statements, promotional offering materials, merger and acquisition (M&A) deal proposals, M&A term sheets and agreements, initial public offering (IPO) disclosures, investment funds prospectuses, Securities and Exchange Commission (SEC) filings.

Documents to which the present invention is applicable may also include any type of visual assets, such as images, video clips, audio files, and combinations thereof. For example, a typical MPEG-1 Audio Layer 3 (or MP3) file may include metadata fields known as ID3 tags, which contain editable and/or searchable information of a song or a piece of music, such as title, artist, album, composer, genre, copyright, rating, and description. Such MP3 files may be stored in a music library which is also one type of document management system. User-specific naming patterns may be accounted for in queries of MP3 music files, and the entitlement-based search techniques may be implemented in a music library.

A "creator" of a document refers to any user who has either created or changed the metadata of that document. So, a document creator may be an author, typist, or any initial maker of the document, or any subsequent user whose access to the document changes its metadata. When one or more documents are referred to as a particular user's document(s), it means that said user is a creator of the document(s) in the sense as described above.

The term "naming patterns" may include any identifiable style or method of describing documents with metadata. A naming pattern is not limited to the way a DMS user creates or modifies a document title, but may be reflected in any metadata field or any combination of metadata fields. In addition, although a naming pattern typically reflects a consistent or habitual way of describing documents, it does not always require the examination of multiple documents. For example, the way a document creator uses aliases or acronyms in a single document may be recorded as "a naming pattern."

Conceptually, user-specific naming patterns as captured and recorded in accordance with embodiments of the present invention is also a type of metadata. In contrast to document metadata in the conventional sense, user-specific naming patterns are more appropriately considered "user metadata" since they are informational data about DMS users. Alternatively, user-specific naming patterns may be considered metadata about document metadata since the naming patterns are typically extracted from the document metadata and reflect some characteristics of the document metadata.

Figure 2:
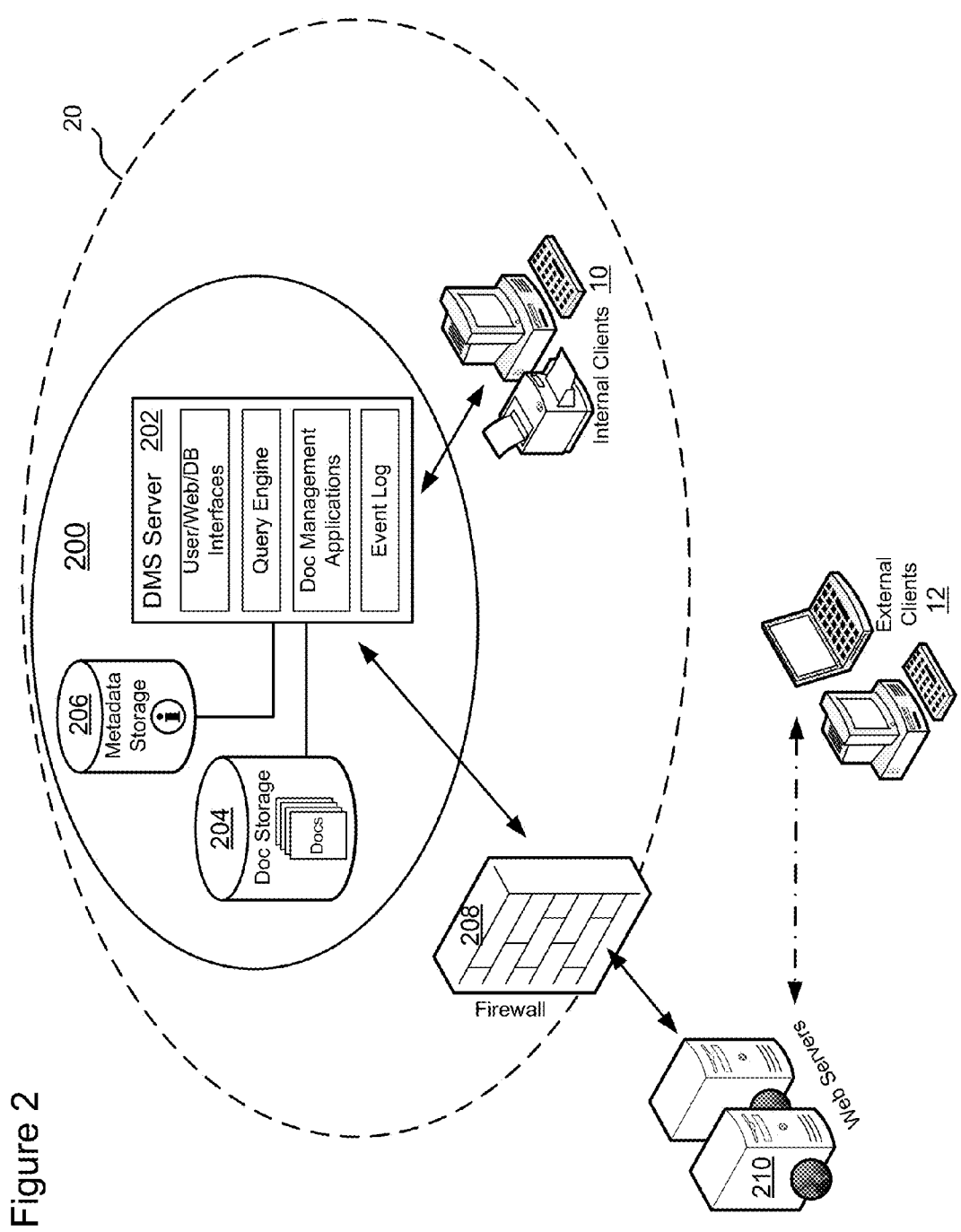
FIG. 2 shows a document management system (DMS) in which techniques to account for user-specific patterns in document metadata may be implemented in accordance with an embodiment of the present invention.

Referring to FIG. 2, there is shown a document management system (DMS) 200 in which techniques to account for user-specific patterns in document metadata may be implemented in accordance with an embodiment of the present invention. The DMS 200 may comprise a DMS server 202, a document storage unit 204, and a metadata storage unit 206. Though depicted here as separate components for illustration purposes, any combination of these components may be implemented in or with a single computing component. The DMS server 202 may be responsible for all the input/output (I/O) functions and data processing needs related to document management. The DMS server 202 may comprise various software and/or hardware modules such as a user interface, a web interface, a storage or database interface, a query engine, document management applications, and an event log. The document management applications module may include a suite of software programs to handle document management tasks, such as document creation, metadata generation, access control, and storage management. The DMS server 202 may be coupled to or in control of the document storage unit 204 and the metadata storage unit 206 which are repositories for documents and metadata respectively. In some embodiment, the documents and corresponding metadata may alternatively be stored in a same storage device.

The DMS server 202 may be situated within an enterprise network 20. Internal clients 10 of the enterprise network 20, such as employees and network administrators, may access the DMS server 202 based on their access rights or entitlements. In addition, external clients 12 of the enterprise network 20, such as customers and traveling or telecommuting employees, may remotely access the DMS server 202. The remote access may be through web servers 210 and a firewall 208. Each of the client devices (e.g., 10 and 12) may implement one or more client software programs, such as web browser add-ons or standalone applications, to interoperate with the DMS server 202. Alternatively, the client devices may communicate with the DMS server 202 via standard web browsers without any special client-side software.

It should be noted that FIG. 2 shows only one exemplary DMS (200) and its typical environment. The document management techniques in accordance with embodiments of the present invention may be implemented in or for other types of DMS, such as a simple DMS that resides in a single computer or an expansive one that sprawl multiple networks across different geographical locations.

Figure 3:
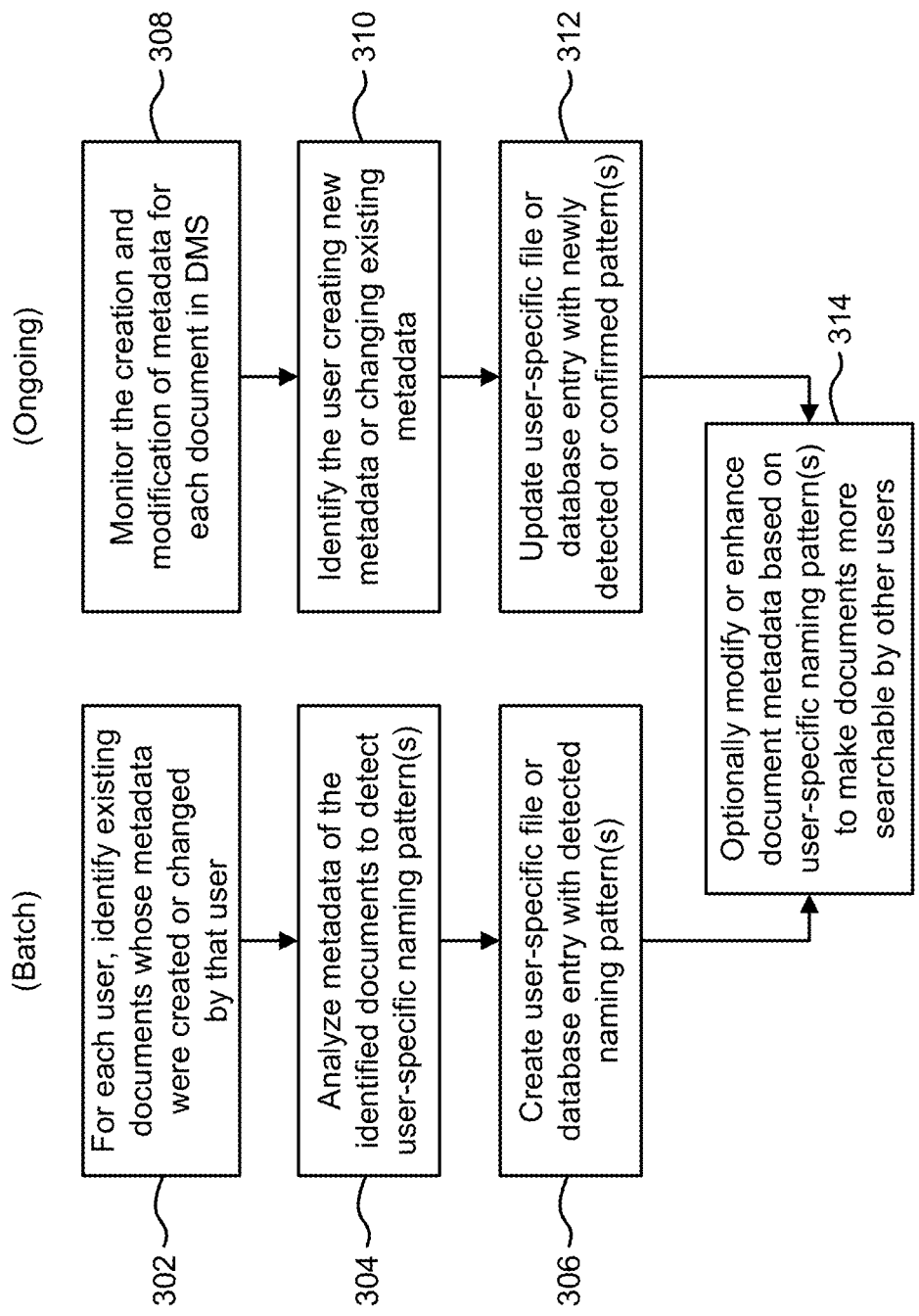
FIG. 3 shows a flow chart illustrating an exemplary method for capturing user-specific naming patterns in accordance with an embodiment of the present invention.

FIG. 3 shows a flow chart illustrating an exemplary method for capturing user-specific naming patterns in accordance with an embodiment of the present invention.

In a pre-existing DMS, i.e., one that has already accumulated a number of documents, the existing documents may be batch processed to capture user-specific naming patterns. So, with respect to each user of the DMS, that user's documents may be identified in step 302. That is, all documents whose metadata were created or changed by that user may be selected.

Then, in step 304, the metadata of those identified documents may be analyzed to detect naming patterns as exhibited by that user. The analysis of the metadata may involve one or more tasks such as locating consistent choices of text strings or menu items in any metadata field, identifying repetitive combinations of entries in two or more metadata fields, and recognizing aliases, acronyms, shorthand spelling, or other uncommon use of words or symbols in text entries. The analysis of the metadata may be further supplemented with information from other sources. For example, in some instances, the DMS may examine the content of underlying documents to extract information that may be helpful in identifying and categorizing the documents and for detection or confirmation of user-specific naming patterns. In other instances, the DMS may solicit or request input from a document creator to shed light on his or her own naming habits. According to one embodiment of the present invention, the detection of user-specific naming patterns may employ fuzzy logic algorithms and/or scoring methods to reflect confidence levels of the naming patterns detected.

In step 306, the user-specific naming patterns detected in step 304 may be recorded in a user-specific file or a database entry created for the corresponding user. That is, the DMS users' naming patterns may be stored either in individual files (referred to as "naming patterns files" or NPFs) or in a database (or lookup table) with entries corresponding to individual users.

The steps 302, 304, and 306 may be repeated until existing documents of all users of the DMS have been processed. If a user does not have a sufficient number of existing documents to allow detection of naming patterns or otherwise does not have any identifiable naming pattern, an NPF or database entry may still be created for that user, which may be flagged for future updates. Alternatively or in addition, a confidence level may be calculated for each user-specific naming pattern that has been recorded in the NPF or database. The confidence level may be based on a sample size from which a naming pattern has been identified. Typically, the larger the sample size (i.e., the more frequently the same or similar naming behavior repeats), the more confident the DMS can be with respect to the naming behavior. With the confidence levels, a process of self-correction and/or self-improvement may be implemented for the NPF or database, such that previously recorded naming patterns may be confirmed or corrected based on additional data samples.

On an ongoing basis, the creation and modification of metadata may be monitored, in step 308, for new or updated documents in the DMS. For example, every time a new document is created in the DMS, the corresponding set of metadata may be processed immediately or soon after document creation. The realtime or near-realtime processing of new metadata may facilitate retrieval of the corresponding new documents by making them more searchable sooner. Alternatively, the DMS may process new metadata at pre-scheduled times or may wait until the number of new documents reaches a predetermined threshold before batch processing new metadata. The batch processing option may be more efficient than the realtime or near-realtime option, though the documents may remain less searchable until the new metadata are fully processed. Similarly, the DMS may also keep track of changes in the metadata of existing documents and process the changed metadata on an ongoing basis.

With respect to each document whose metadata have recently been created or changed, a user creating or changing the metadata may be identified in step 310. Then, in step 312, that user's NPF may be updated based on newly detected or confirmed naming pattern(s), if any. Based on the user's recently created or modified documents and/or the user's existing NPF, a new naming pattern specific to that user may be detected or an existing naming pattern of that user may be confirmed. For example, if the new metadata, alone or in combination with prior metadata, show a new naming pattern, that new naming pattern may be recorded in the NPF. If a recently created or changed set of metadata reflects a previously recorded naming pattern, that naming pattern may be confirmed in the NPF, for example, with an increased confidence level.

According to some embodiments of the present invention, the user-specific naming patterns may be recorded in the form of NPF files or database entries and stored independent of document metadata. Alternatively or additionally, the document metadata may be modified or enhanced in step 312, based on the user-specific naming patterns, in order to make the documents more searchable by other users.

A number of methods may be employed to "translate" or "normalize" metadata of one user's documents for improved searchability by other users. For example, aliases, acronyms and shorthand spellings can be replaced or at least annotated with appropriate words and phrases that other users are likely to understand. Poorly categorized documents may be re-categorized or cross-categorized with more descriptive menu items.

Figure 7:
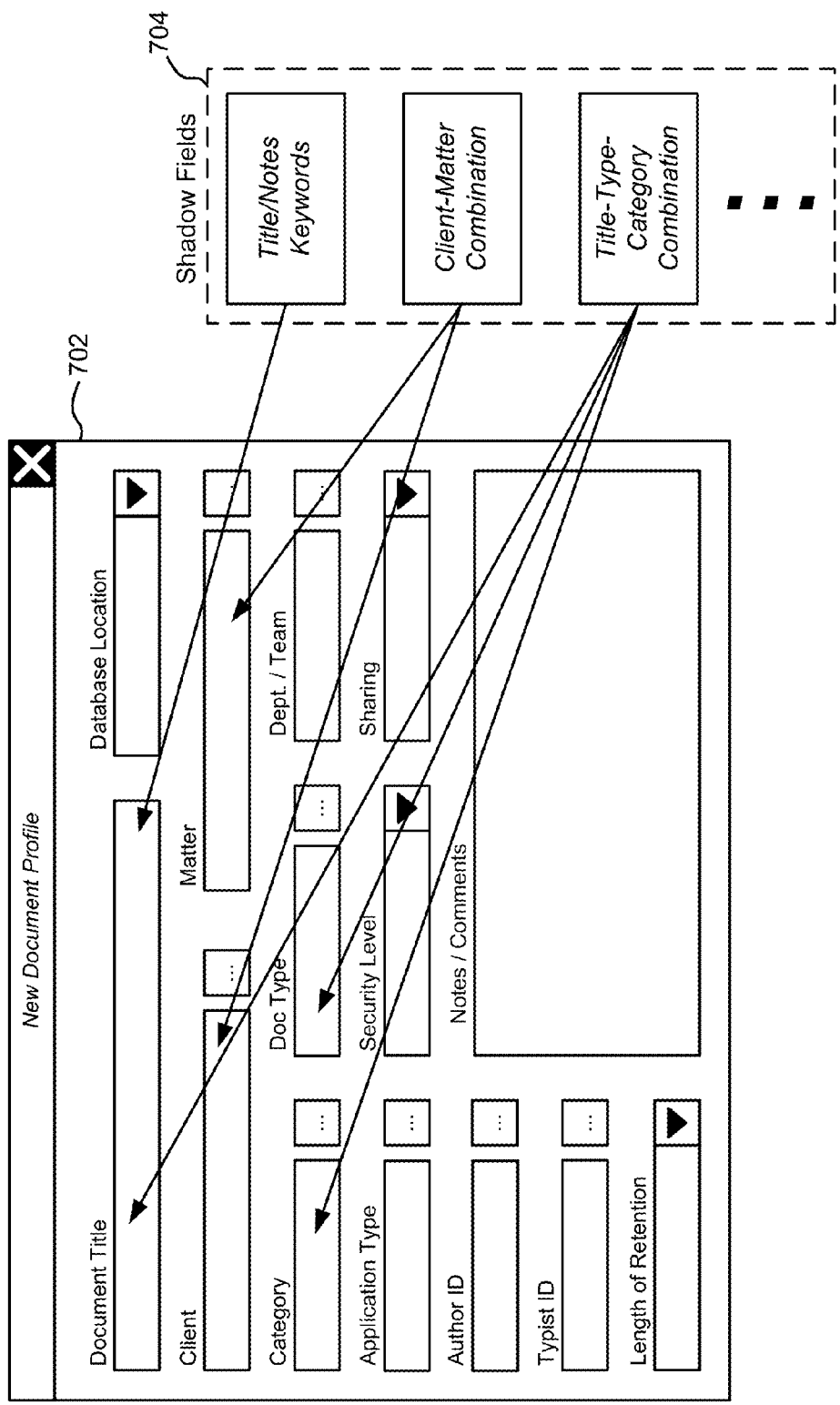
FIG. 7 shows exemplary document metadata fields and shadow fields in accordance with an embodiment of the present invention.

While the document creator's choice of metadata may be modified or replaced, it might be beneficial to keep the original metadata intact and enhance the metadata fields with additional information based on the user-specific naming patterns. According to one embodiment of the present invention, "shadow fields" may be provided to enhance or augment an original set of metadata fields, one example of which is illustrated in FIG. 7. FIG. 7 shows a "New Document Profile" window 702 similar to the one shown in FIG. 1. In addition to what a document creator provides in the various metadata fields, the DMS may generate one or more shadow fields 704 based on naming patterns that are specific to the document creator. For example, one shadow field may include keywords that are more appropriate or more descriptive than those provided by the document creator in the title and notes/comments fields. Variations and synonyms of the keywords may also be included. Aliases or acronyms in text entries of the document creator may be translated. Another shadow field may include one or more client-matter combinations that are more appropriate or more specific than what is provided by the document creator. Yet another shadow field may include an interpretation of the document creator's unique combination of title, document type and document category, thereby providing a more commonly recognizable combination. The shadow fields 704 are also metadata but are not directly input by the document creator and typically may not be displayed to the document creator. Instead, the shadow fields may co-exist with the conventional metadata in the background (hence the term "shadow" fields) and may be searched just like conventional metadata. With the shadow fields and/or other metadata enhancement, documents may be virtually re-described, re-categorized, and/or re-organized to facilitate document retrieval that is less affected by user-specific naming patterns.

Figure 4:
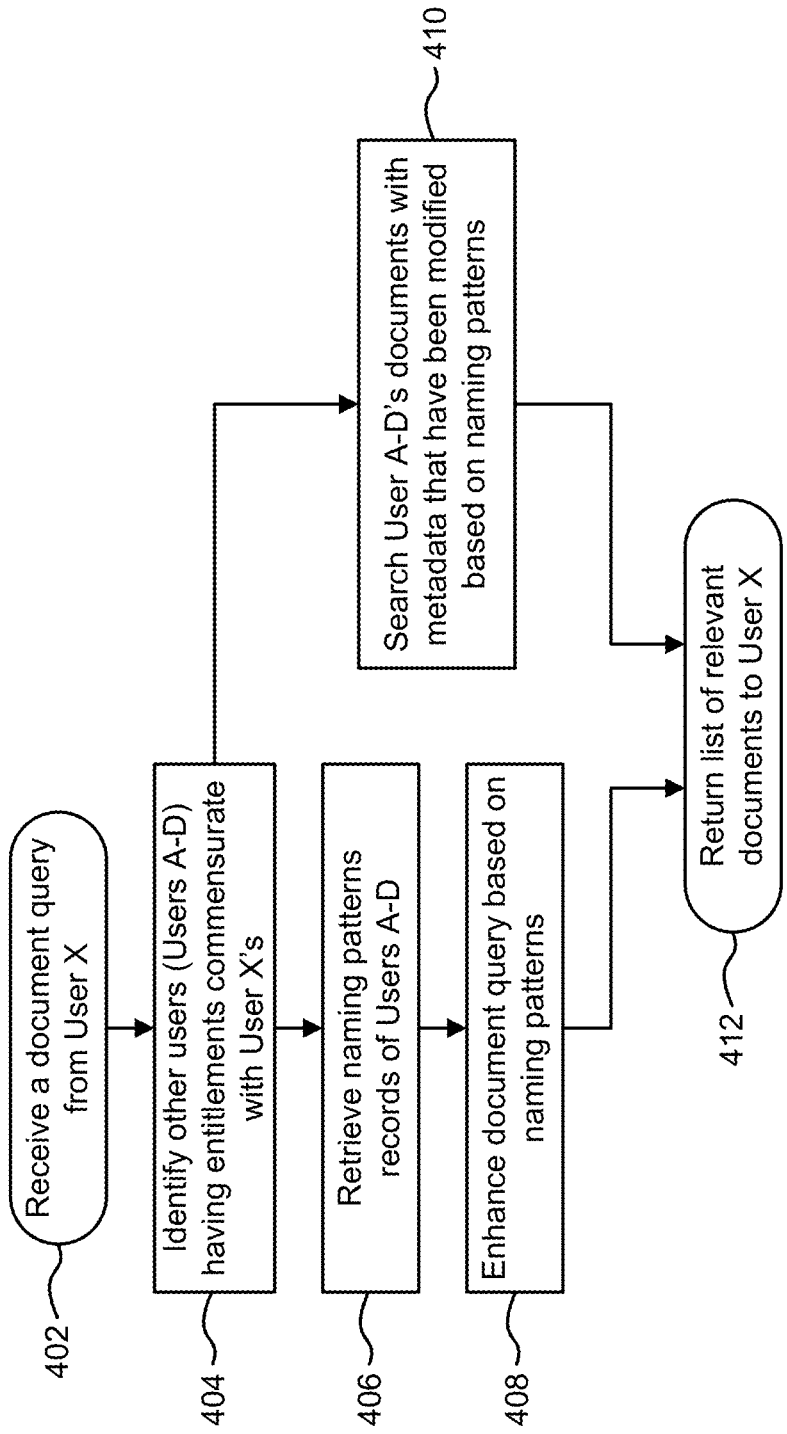
FIG. 4 shows a flow chart illustrating an exemplary method for facilitating document retrieval based on user-specific naming patterns in accordance with an embodiment of the present invention.

FIG. 4 shows a flow chart illustrating an exemplary method for facilitating document retrieval based on user-specific naming patterns in accordance with an embodiment of the present invention.

In step 402, a document query may be received from User X. User X may be an employee of a company and also a user of the company's DMS. User X may have a particular entitlement to access documents stored in the DMS. The entitlement (or access rights) may be assigned and enforced on one or more granular levels. For example, User X may be entitled to access certain individual documents in the DMS but not any other documents. Or, User X may be allowed to access one type or category of documents but not any other type or category. Or, User X may have access rights for one or more libraries of documents within the DMS. User X's entitlement with respect to each document is an all-or-nothing arrangement, wherein User X's right to access a document applies to the entire document. Alternatively, User X's entitlement may be further designated on a sub-document level, wherein User X might access some sections or pages of a document but not other sections or pages.

The document query may be formulated in the form of one or more terms related to metadata fields. The document query is typically entered via a graphical user interface (GUI) but may also be input as a command line. The document query may be directed to documents created by current or previous colleagues of User X.

In step 404, the DMS may identify other users who have entitlements that are commensurate with User X's entitlement. A user's entitlement may be considered commensurate with User X's if User X is authorized to access at least a portion of that user's documents or if there is likelihood that User X may acquire authority to access that user's documents (e.g., User X having only a slightly narrower scope of entitlement). In this example, Users A, B, C and D may be identified as such users. They may be User X's colleagues or predecessors whose documents User X is allowed to access. According to one embodiment of the present invention, User X may be allowed to search for documents beyond User X's entitlement at time of the search. Or, the DMS may automatically expand the scope of the search to include relevant documents that User X does not yet have authority to access. In either case, User X may be presented with a list of hits including "locked" (or "grayed-out") documents and be prompted to seek permission (temporary or permanent) in order to "unlock" those documents. User X may cause the system to temporarily store the list of hits until the permission is granted.

In step 406, records of user-specific naming patterns associated with Users A-D may be retrieved. As described above, the records may be NPFs or database entries.

In step 408, the document query submitted by User X may be enhanced based on User A-D's naming patterns. For example, the original document query from User X may be parsed, and additional keywords or menu items in User A-D's metadata that might match User X's search terms may be included in the query. Optionally, the document query may be enhanced with User X's own naming patterns, if any. For example, if User X has some known habits of using certain terms in document metadata, the meanings of those terms may be translated and included in the enhanced document query.

According to some embodiments of the present invention, User A-D's documents (i.e., those to which User X has entitlement) may already have had their metadata modified or enhanced based on User A-D's naming patterns, as described above. In that case, as an alternative to steps 406 and 408, such modified or enhanced metadata may be directly searched with the original document query submitted by User X.

Finally, in step 412, a list of relevant documents may be returned to User X. The list of "hits" may be a result of the enhanced document query (step 408), the search of enhanced metadata (step 410), or both.

Figure 5:
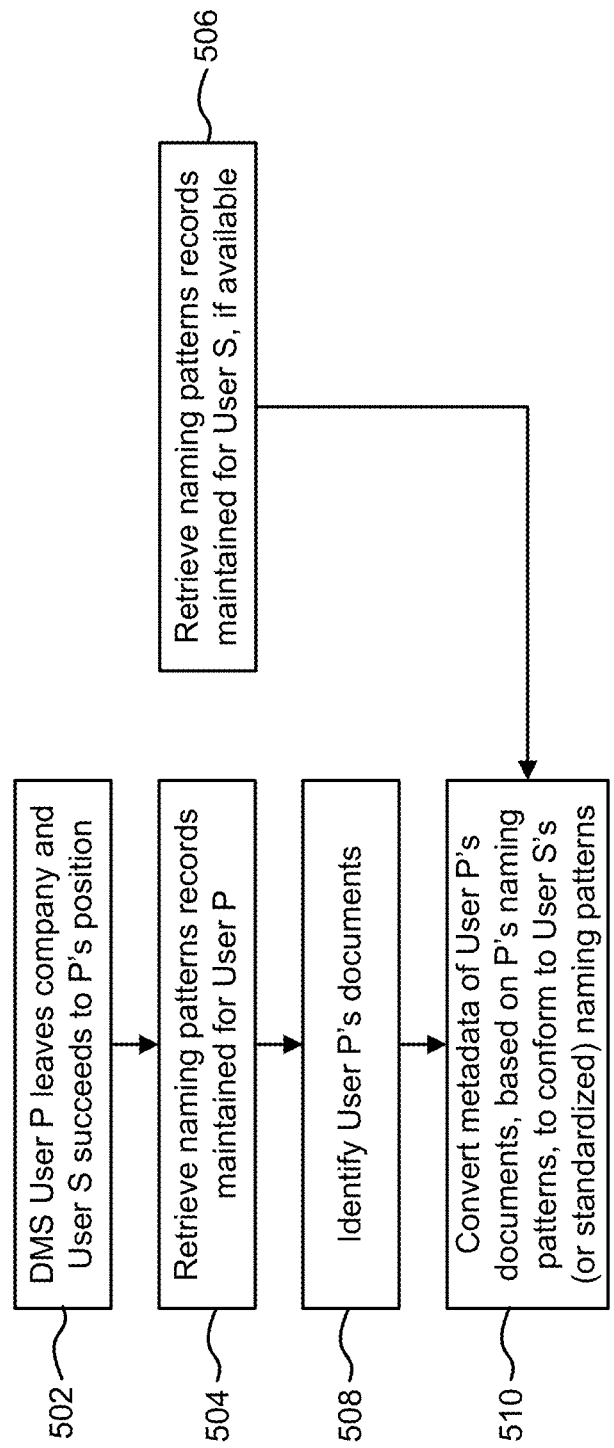
FIG. 5 shows a flow chart illustrating another exemplary method for facilitating document retrieval based on user-specific naming patterns in accordance with an embodiment of the present invention.

FIG. 5 shows a flow chart illustrating another exemplary method for facilitating document retrieval based on user-specific naming patterns in accordance with an embodiment of the present invention.

In step 502, a DMS User P (P for predecessor) leaves a company and User S (S for successor) succeeds to User P's position in the company. As User P's successor, User S may need to retrieve some of User P's documents that are stored in the company's DMS. To facilitate retrieval of User P's documents, User S's document queries may be enhanced based on P's naming patterns. Alternatively, as described in connection with the following method steps, metadata of all of User P's documents may be converted based on P's naming patterns. The conversion may be desirable because there is no longer a need to maintain the original metadata for User P's convenience. The main concern now is whether User S and/or other similarly-situated users can easily locate and retrieve P's documents.

In step 504, records of User P's naming patterns, such as an NPF and/or database entries, may be retrieved. Similarly, in step 506, records of User S's naming patterns, if available, may also be retrieved.

In step 508, all of User P's documents to which User S has entitlement may be identified. User S, as P's successor, may have identical entitlement as User P. However, it is also possible that User S has a broader or narrower scope of entitlement than User P.

Then, in step 510, metadata of those documents identified in step 508 may be converted, based on User P's naming patterns, either to conform to User S's naming patterns or to comply with some standardized naming conventions. That is, User P's metadata may be "translated" for User S, such that what makes sense to User P will be understood and searchable by User S in P's absence. Alternatively, User P's metadata may be "normalized" so that P's unique way of naming or describing documents is generally understood and searchable by other users of the DMS.

Of course, FIG. 5 only shows the simplest example where User P has a single successor, User S. In more general cases, User S is just one of a number of DMS users who can access User P's documents. In that case, the conversion of metadata of User P's documents may be still be performed, either individually or collectively for DMS users whose entitlements are commensurate with User P's.

In some cases, after User P leaves the company, no other user of the company's DMS may have entitlement to access User P's documents. As a result, User P's documents may become "orphans." According to some embodiments of the present invention, this situation may be detected by the DMS as soon as User P is removed from the user list. For example, upon removal of User P, the DMS may be configured to automatically comb through User P's documents to identify those which User P has exclusive access. The newly identified orphan documents may be flagged and their metadata may be translated for review by authorized administrative personnel. For example, a descriptive summary of the orphan documents may be generated based on their metadata as well as User P's naming patterns, such that a reviewer may understand a general relevance of those documents without reading their content. It may then be determined which employee(s) of the company will inherit the orphan documents. Accordingly, the metadata of those documents may be translated or normalized, based on User P's naming patterns, for the convenience of the new owner(s).

According to other embodiments of the present invention, a mechanism may be implemented to proactively prevent a document from becoming an orphan. For example, it may be indicated, in the metadata of each document, as to a total number of DMS users who have entitlement to that document. With the exception of private, personal documents, a rule may be enforced to ensure each document is accessible by two or more users. As soon as the number of authorized users of a document drops to one, the DMS may alert a super-user or administrator to review the metadata of that document and to identify other DMS users who might be authorized to access that document.

Figure 6:
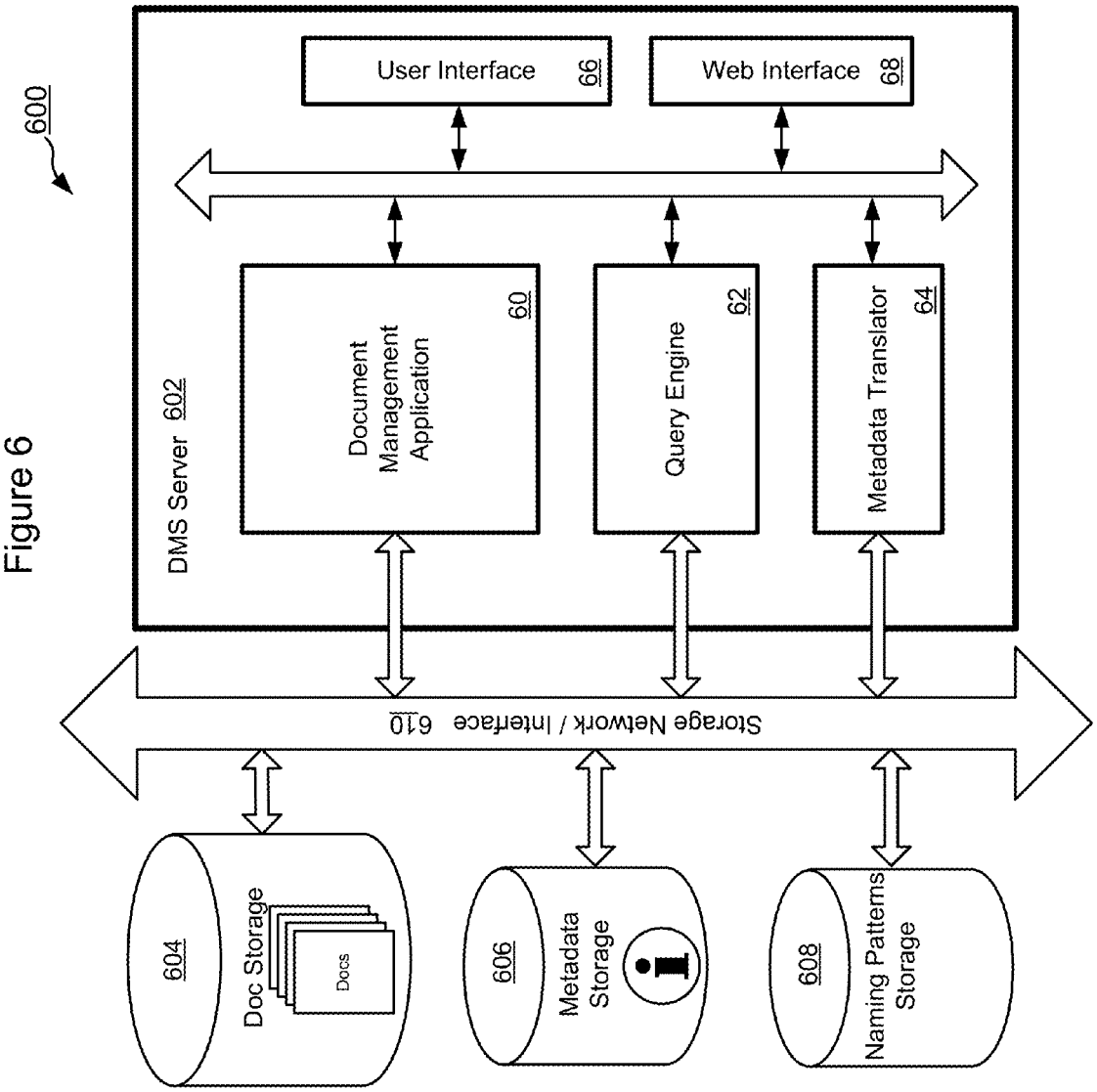
FIG. 6 shows a block diagram illustrating an exemplary system for facilitating document retrieval based on user-specific naming patterns in accordance with an embodiment of the present invention.

FIG. 6 shows a block diagram illustrating an exemplary system 600 for facilitating document retrieval based on user-specific naming patterns in accordance with an embodiment of the present invention.

The system 600 may be or include a computer system. This embodiment of the present invention may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system 600 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, RUM and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

More specifically, the system 600 may comprise a DMS server 602 which is coupled to a document storage unit 604, a metadata storage unit 606, and a naming patterns storage unit 608. Though they are shown as separate components, these storage units (604, 606 and 608) may be combined with one another or with the DMS server 602. The DMS server 602 may comprise a document management application module 60, a query engine 62, a user interface 66, and a web interface 68.

In addition, the DMS server 602 may comprise or be coupled to a metadata translator 64 that is responsible for the capture, management, and use of user-specific naming patterns in accordance with embodiments of the present invention. Although depicted in FIG. 6 as an internal, integrated module that is separate from the document management application module 60 and the query engine 62, the metadata translator 64 may be implemented in a number of different ways. For example, the metadata translator 64 may be an add-on module that is external to the DMS server 602. Alternatively, some or all of the functions of metadata translator 64 may be included in the document management application module 60 or the query engine 62. According to yet another embodiment of the present invention, some functions for capturing naming patterns and/or enhancing document queries may be implemented in or supplemented by one or more client-side software agents residing in individual users' computers and/or terminals. That is, not all the functions related to use-specific naming patterns have to be implemented or performed centrally by the DMS server 602.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A computer-implemented method for facilitating document retrieval in an electronic document management system, the method comprising the steps of:

identifying, by at least one processor, one or more user-specific naming patterns in metadata created by a first user in connection with a plurality of documents;

recording, by at least one processor and in a storage medium, said identified one or more user-specific naming patterns in at least one of a naming patterns file (NPF), database, and lookup table;

creating, by at least one processor, a modified copy of the metadata wherein at least a portion of the original metadata created by the first user are modified, based on the recorded user-specific naming patterns, to improve searchability of the plurality of documents by other users;

storing the modified copy of the metadata in association with the plurality of documents; and making the modified copy of the metadata available in a document query for one or more of the plurality of documents by a second user.

2. The method according to claim 1, wherein the step of creating the modified copy of the metadata comprises replacing at least one of aliases, acronyms and shorthand spellings.

3. The method according to claim 1, wherein the step of creating the modified copy of the metadata comprises incorporating additional information in the metadata.

4. The method according to claim 1, further comprising normalizing the metadata based on the recorded one or more user-specific naming patterns.

5. The method according to claim 1, wherein the step of identifying one or more user-specific naming patterns occurs each time the first user creates or modifies document metadata.

6. The method according to claim 1, wherein the one or more user-specific naming patterns are identified by processing two or more of the plurality of documents in a batch.

7. The method according to claim 1, wherein the one or more user-specific naming patterns are selected from a group consisting of:
one or more consistent choices of text strings or menu items in a single metadata field;
one or more combinations of entries in two or more metadata fields; and
one or more aliases or acronyms in text entry of any metadata field.

8. The method according to claim 1, wherein the one or more identified user-specific naming patterns are recorded in association with the metadata related to each of the plurality of documents.

9. The method according to claim 1, wherein the one or more identified user-specific naming patterns are recorded in association with the first user.

10. The method according to claim 1, further comprising:
retrieving at least one document based on the document query from the second user and further based at least in part on the modified copy of the metadata.

11. A non-transitory computer readable medium having code for causing at least one computer processor to facilitate document retrieval in an electronic document management system by performing the steps of:
identifying one or more user-specific naming patterns in metadata created by a first user in connection with a plurality of documents;
recording, in a storage medium, said identified one or more user-specific naming patterns in at least one of a naming patterns file (NPF), database, and lookup table;
creating a modified copy of the metadata wherein at least a portion of the original metadata created by the first user are modified, based on the recorded user-specific naming patterns, to improve searchability of the plurality of documents by other users;
storing the modified copy of the metadata in association with the plurality of documents; and
making the modified copy of the metadata available in a document query for one or more of the plurality of documents by a second user.

12. The non-transitory computer readable medium according to claim 11, wherein creating the modified copy of the metadata comprises replacing at least one of aliases, acronyms and shorthand spellings.

13. The non-transitory computer readable medium according to claim 11, wherein creating the modified copy of the metadata comprises incorporating additional information in the metadata.

14. The non-transitory computer readable medium according to claim 11, further comprising code for normalizing the metadata based on the recorded user-specific naming patterns.

15. The non-transitory computer readable medium according to claim 11, wherein the step of identifying one or more user-specific naming patterns occurs each time the first user creates or modifies document metadata.

16. The non-transitory computer readable medium according to claim 11, wherein the one or more user-specific naming patterns are identified by processing two or more of the plurality of documents in a batch.

17. The non-transitory computer readable medium according to claim 11, wherein the one or more user-specific naming patterns are selected from a group consisting of:
one or more consistent choices of text strings or menu items in a single metadata field;
one or more combinations of entries in two or more metadata fields; and
one or more aliases or acronyms in text entry of any metadata field.

18. The non-transitory computer readable medium according to claim 11, wherein the one or more identified user-specific naming patterns are recorded in association with the metadata related to each of the plurality of documents.

19. The non-transitory computer readable medium according to claim 11, wherein the one or more identified user-specific naming patterns are recorded in association with the first user.

20. The non-transitory computer readable medium according to claim 11, further comprising code for:
retrieving at least one document based on the document query from the second user and further based at least in part on the modified copy of the metadata.

* * * * *